Jan. 29, 1963　　W. J. BICHELL ET AL　　3,076,187
VISUAL INDICATOR
Filed March 22, 1961

WILLIAM J. BICHELL
JAMES R. RANSOM
INVENTORS

BY Robert J. Killman
ATTORNEY

United States Patent Office 3,076,187
Patented Jan. 29, 1963

3,076,187
VISUAL INDICATOR
William J. Bichell, Rte. 1, Box 112, Phoenix, Md., and James R. Ransom, 1502 Kennewick Road, Baltimore, Md.
Filed Mar. 22, 1961, Ser. No. 97,526
3 Claims. (Cl. 340—378)

This invention relates to an indicator, and more particularly to a visual indicator in the form of a compact, in-line, in-plane readout type.

With the ever increasing demand for subminiaturization combined with ruggedness and high reliability, particularly in airborne equipments, it is of the utmost importance that indicators used in numerous positions with various equipments in airborne vehicles be easy to read, reliable in operation, light in weight, compact in size, and low in cost.

Therefore it is an object of this invention to provide a visual indicator that will have a high order of reliability, and yet can be manufactured economically.

It is another object to provide a visual indicator which contains no moving parts, and is light in weight.

It is still another object to provide a visual indicator than can be stacked one upon the other or placed in side-by-side relationship.

It is a further object to provide a visual indicator having a low power consumption that will produce well defined characters, with the ability to retain the characters after the power is removed.

These and further objects will become apparent from the following description taken in connection with the accompanying drawings in which.

Figure 1:
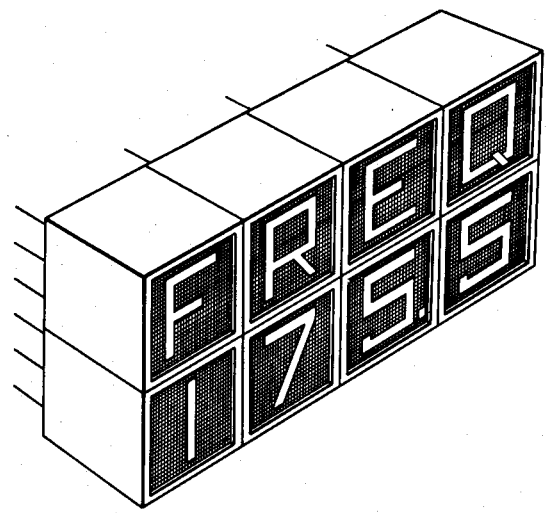
FIG. 1 is a perspective view of a group of indicators in a side-by-side and stacked relationship.

Referring now to FIG. 1 there is illustrated a group of indicators of the subject invention placed side-by-side and stacked in two rows. The top rows shows letters of the alphabet being indicated, while the bottom row shows numerals being indicated. However, the indicator of the subject invention will indicate letters, digits, symbols, or combinations thereof depending only on how the D.C. potential is connected to its elements. This will be more fully explained later.

Figure 2:
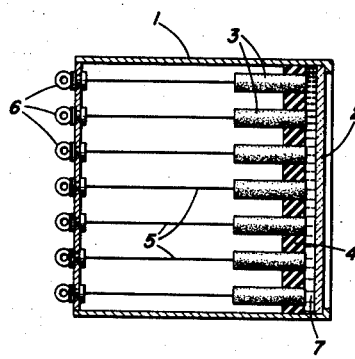
FIG. 2 is a sectional view of one indicating unit of the group of indicators illustrated in FIG. 1.

As shown in FIG. 2, each indicating unit comprises a sealed case 1, the front of which has a transparent window 2. Positioned behind window 2, and in spaced relationship thereto are carbon rods 3 insulated from one another and supported by insulating base 4. Connecting wires 5 join the individual carbon rods 3 to terminals 6. The carbon rods 3 and insulating base 4 are so mounted in case 1 as to form a space 7 approximately 1/16 of an inch between the forward ends of rods 3 and base 4, and the window 2. The space 7 thus formed is filled with a clear liquid having electrolytic properties, such as for example silver cyanide, or silver nitrate, in a polar liquid usually including some water. A variety of useful solutions may be found in texts on electroplating.

Figure 3:
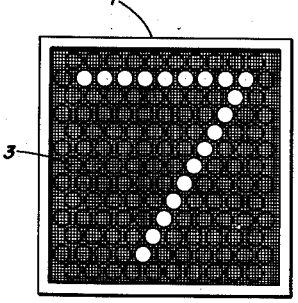
FIG. 3 is an elevation of an indicating unit with the digit 7 being indicated.

By means of a suitable switching system, many of which are known and readily available for such an application, the carbon rods used in forming a desired character or digit, the number 7 for instance as illustrated in FIG. 3, are connected together and thence to a negative source of D.C. potential, not shown, while the remaining carbon rods are connected together and to a positive source of D.C. potential. Current then flows through the electrolyte from the positive connected carbon rods to the negative connected carbon rods causing an electroplating action to take place depositing a silver colored film on the negative connected rods. Since the positive connected rods and the insulating base are black, the silver plated negative connected rods stand out in sharp contrast as illustrated in FIG. 3. Reversal of polarity would, of course, show a dark character on a light background.

Figure 4:
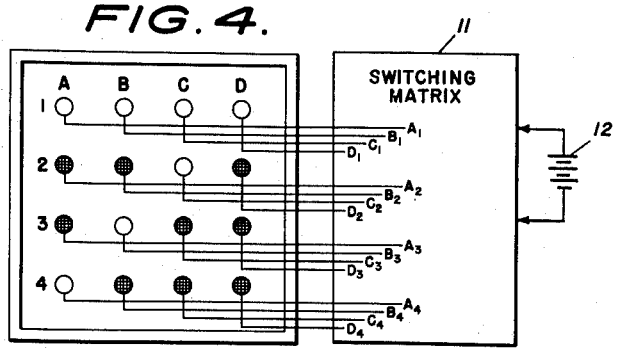
FIG. 4 is a schematic helpful in explaining the operation of the invention.

Referring now to FIG. 4, there is pictorially shown a front view of the invention with the digit 7 indicated, and labeled wires attached to each of the carbon rods. Thus wires $A_1$, $B_1$, $C_1$, $D_1$, $C_2$, $B_3$, and $A_4$ are connected by a switching matrix 11 to the negative side of a source of D.C. potential 12 and wires $A_2$, $B_2$, $D_2$, $A_3$, $C_3$, $D_3$, $B_4$, $C_4$, and $D_4$ are connected together and to the positive side of the source of D.C. potential, the current flowing from positive to negative through the electrolyte will cause the negative connected rods to become electroplated as previously described, and the digit 7 will be indicated. The D.C. potential can now be disconnected and the digit 7 will remain indicated with no further expenditure of electrical energy until another digit or character is switched. Alternatively, with the proper choice of solution, potential may be applied to the indicator indefinitely. The reaction would continue until all the metal ions were displaced from the solution. The potential would then be opposed by ions of the solution and only a minute current flow would take place.

The overall size of the indicator unit is dependent only on the required size of the digit, character or symbol.

It may readily be understood that the objects of this invention may be achieved by the particular embodiments described and illustrated in the application, but that said objects nevertheless may be realized from the use of various other embodiments without departing from the invention as set forth in the following claims.

What is claimed is:

1. An indicator comprising a housing, an aperture covered by a transparent material in said housing, a plurality of electrodes supported in said housing by an insulating support, the ends of said electrodes terminating in a common plane internally of said housing and spaced from said transparently covered aperture, an electrolytic plating solution filling the space between said electrode ends and said transparently covered aperture, a direct current source, and means for selectively connecting certain of said electrodes to one pole of said source and for connecting the remainder of said electrodes to the other pole of said source.

2. An indicator comprising an enclosure, a transparently covered aperture in said enclosure, a mosaic of electrically conductive elements insulated from one another and mounted in spaced relationship to said aperture, an electrolytic plating solution in said enclosure, a direct current source and means for connecting selected elements of said mosaic to one pole of said current source and for connecting the remaining elements of said mosaic to the other pole of said source whereby an intelligible character will be plated on the surface of said mosaic.

3. An indicator comprising a housing, a window in said housing, a plurality of carbon rods insulated from one another and positioned in said housing so as to provide a space between one end of said rods and said window, an electrolytic plating solution in said space, a direct current source and means for supplying positive current from said source to selected ones of said rods with the remainder of said rods returning negative current to said source.

References Cited in the file of this patent
UNITED STATES PATENTS

| | | |
|---|---|---|
| 596,774 | Herzog | Jan. 4, 1898 |
| 839,291 | Herzog | Dec. 25, 1906 |
| 2,770,061 | Marcy | Nov. 13, 1956 |